United States Patent [19]
Reibl

[11] Patent Number: 5,701,535
[45] Date of Patent: Dec. 23, 1997

[54] CAMERA WITH MOVABLE OPTICAL ALBADA VIEWFINDER

[75] Inventor: Michael Reibl, Boblingen, Germany

[73] Assignee: Eastman Kodak Company, Rochester, N.Y.

[21] Appl. No.: 668,192

[22] Filed: Jun. 21, 1996

[30] Foreign Application Priority Data

Jun. 22, 1995 [DE] Germany .......... 295 10 157.1

[51] Int. Cl.$^6$ .......... G07B 13/02; G07B 17/04
[52] U.S. Cl. .......... 396/373; 396/348
[58] Field of Search .......... 396/373, 383, 396/348

[56] References Cited

U.S. PATENT DOCUMENTS

| | | | |
|---|---|---|---|
| 3,153,995 | 10/1964 | Bretthauer et al. | 95/11 |
| 3,592,117 | 7/1971 | Fukuda | 95/86 |
| 3,950,771 | 4/1976 | Winkler | 354/187 |
| 4,079,399 | 3/1978 | Hopfner | 354/221 |
| 5,146,253 | 9/1992 | Swayze | 354/187 |
| 5,253,002 | 10/1993 | Kwak | 354/126 |

FOREIGN PATENT DOCUMENTS

| | | |
|---|---|---|
| 1170240 | 9/1961 | Germany . |
| 7625869 | 12/1976 | Germany . |
| 2362429B2 | 2/1977 | Germany . |

*Primary Examiner*—Safet Metjahic
*Assistant Examiner*—John Chizmar
*Attorney, Agent, or Firm*—Robert Luke Walker

[57] ABSTRACT

The photographic camera has an optical direct viewfinder based on the inverse Galilean optical principle. The direct viewfinder is vertically extendible out of the camera body relative to the optical axis of the camera and is retractable back into the body. The direct viewfinder is designed as a one-piece U-shaped component enclosing the camera body and guided therein, with integrated front lens and integrated eyepiece lens. The extension movement is preferably effected by a compression spring exerting a corresponding force on the direct viewfinder.

17 Claims, 3 Drawing Sheets

5,701,535

CAMERA WITH MOVABLE OPTICAL ALBADA VIEWFINDER

FIELD OF THE INVENTION

The invention relates to a photographic camera having an optical direct viewfinder, based on the inverse Galilean optical principle, that is extendible out of the camera body vertically to the optical axis of the camera and is retractable back into the body.

BACKGROUND OF THE INVENTION

Rigid or folding albada viewfinders are known mainly in underwater cameras, however these viewfinders are provided only as a frame and without optical elements. In addition, there are design examples in which the viewfinder is movably accommodated in one part of the camera. This is achieved with considerable technical effort, but without achieving the requirements of an albada viewfinder. The viewfinders are usually inadequately dimensioned. When the viewfinders are made large in size, they then cannot be integrated into the required camera design in a space-saving manner. Cameras are known from the prior art in which the viewfinder is accommodated inside the body when the camera is not in use.

German Patent 1 170 240 describes a photographic camera having a direct viewfinder based on the inverse Galilean optical principle. The viewfinder is mounted on the upper narrow side of the camera. The viewfinder front lens frame is provided with a slide that penetrates into the camera when the viewfinder is folded in. The viewfinder folding mechanism has a lens fitted in the frame on the front of the camera that is guided on the inside and is connected to a slide that effects covering of the camera lens when the viewfinder is pushed together. The front lens frame is rigidly connected to a cover whose rear end is connected to the eye lens mounting by hinged struts. The eye lens mounting is pivotably mounted on the top of the camera by a hinge and folds down flat thereon. The cover is flush with the body when folded together.

German utility model 7 625 869 discloses a viewfinder camera with a movable viewfinder. The camera is equipped with a covering cap which is movable transversely to the optical axis of the camera and includes a viewfinder lens and a viewfinder eyepiece. In the extended position, the viewfinder (lens and eyepiece) are each free to be looked through. In the retracted position of the cap, the viewfinder lens projects from the front of the camera while the viewfinder eyepiece finds space between the cover and the camera side.

German patent 2 362 429 discloses a photographic camera of flat design having a body section extendible and retractable in the longitudinal direction of the camera body and equipped with a cover matched to the cross-section of the camera body, and in which the body section releases an optical direct viewfinder in the extended state and in the retracted state is flush with the camera body and inside the latter.

SUMMARY OF THE INVENTION

The object underlying the present invention is to create a camera having a movable optical albada viewfinder that is adequately dimensioned and that can be accommodated inside the camera in a space-saving manner. In addition, the camera should be of simple design and inexpensive manufacture.

This is achieved in accordance with the invention in that the direct viewfinder is designed as a one-piece U-shaped component enclosing the camera body and guided therein, with integrated front lens and integrated eyepiece lens.

The advantage of the device in accordance with the invention is that the direct viewfinder of the camera is made in one piece, and that in the retracted position the direct viewfinder is flush with the outer contour of the camera. The handling or extension of the direct viewfinder is simple and is achieved by operating the film transport lever. This pulls back a retaining nose provided on the film transport lever and engaging in a recess provided on the direct viewfinder in the retracted state. The direct viewfinder is designed U-shaped, with the sides of the "U" being spaced such that the direct viewfinder encloses the camera body and is therefore movable back and forth, vertically to the optical axis, from a retracted position to an extended one. The movement for extending the viewfinder is initiated by a compression spring surrounding a guide rod connected to the direct viewfinder.

Further advantageous embodiments of the invention are shown in the sub-claims.

DETAILS OF THE INVENTION

Figure 1:
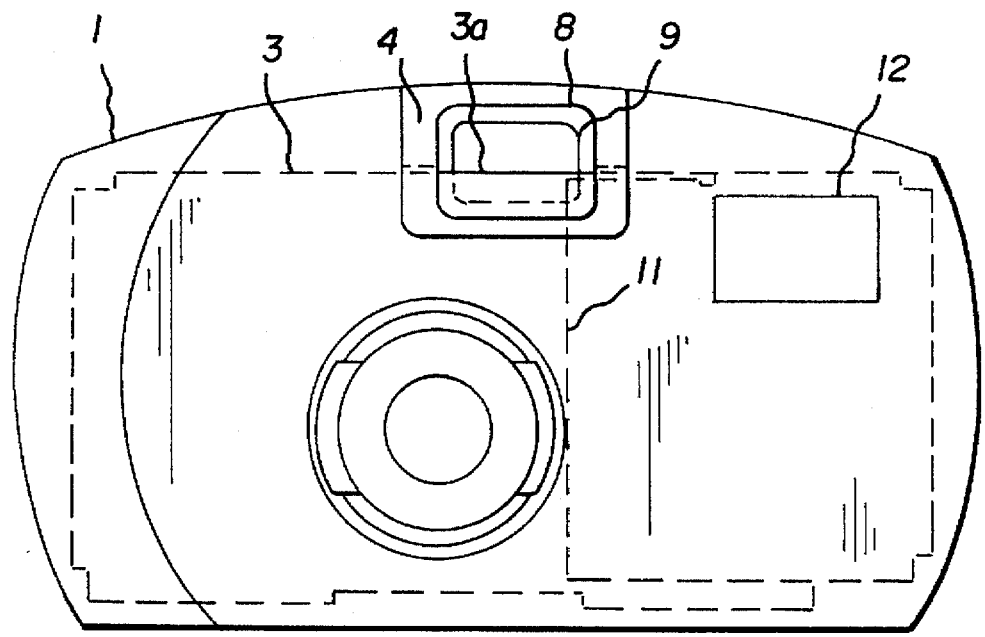
FIG. 1 the camera with retracted direct viewfinder in a front view.
Figure 3:
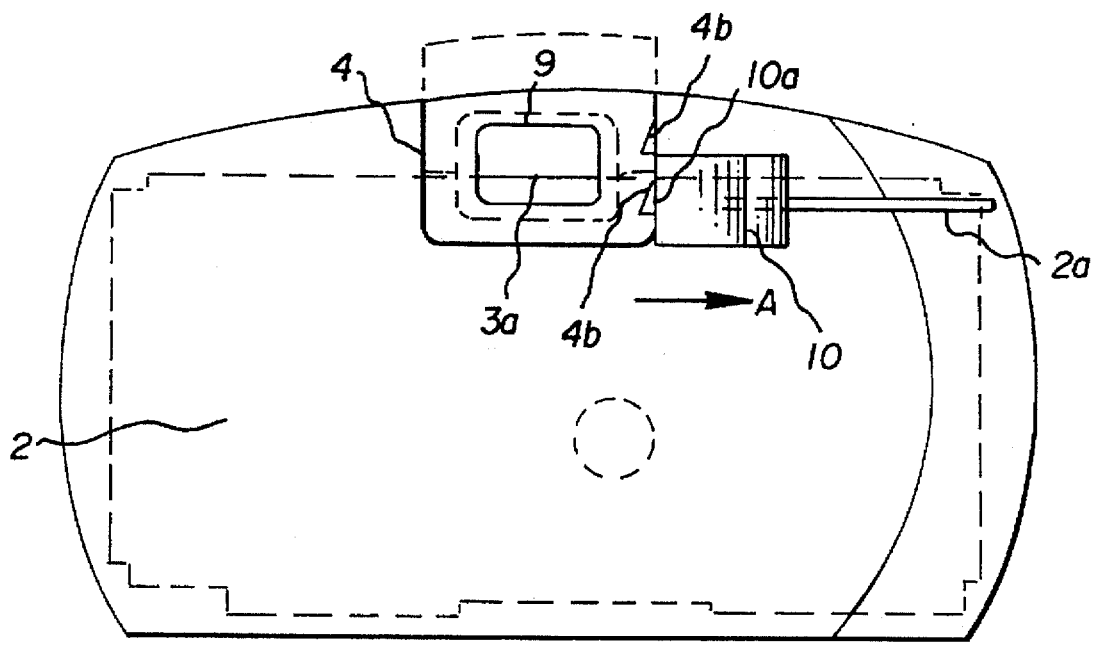

The camera comprises a camera body 3 enclosed by a from shell 1 (see FIG. 1) and a rear wall 2 (see FIG. 3). On the camera body 3 is a direct viewfinder 4 having a U-shaped design such that it extends around the camera body 3 (shown in a dotted line). The camera body 3 has an upper recess 3a adjacent to a front recess 3d. The recesses 3a and 3d receive the direct viewfinder 4 in the retracted position such that it is flush with the outer contour of the camera formed from the front shell 1 and the rear wall 2. The direct viewfinder 4 comprises a transparent and clear material, preferably plastic. A front lens 8 and an eyepiece lens 9 are integral in one piece with the direct view finder 4. Similarly, a flash window 12 is provided in the front shell 1. A circuit such as is commonly known (shown by thick line) is provided inside the camera body 3 and behind the flash window 12 in order to supply the necessary energy for the flash.

Figure 2:
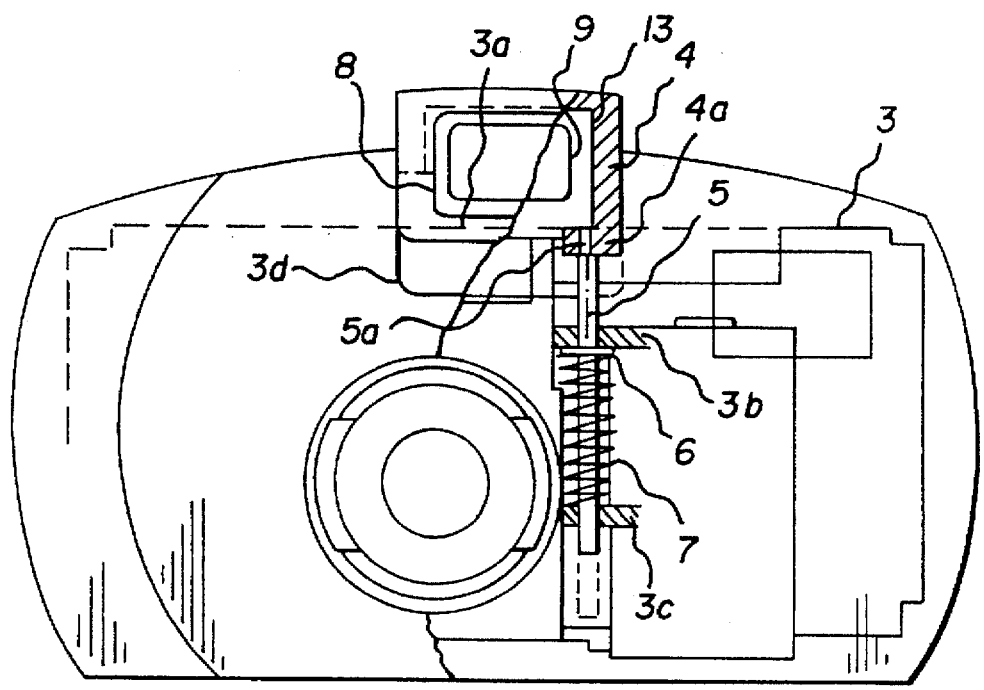
FIG. 2 the camera with extended direct viewfinder in a front view and partial section, FIG. 3 the camera with retracted direct viewfinder in a rear view, FIG. 4 the camera in a plan view and the direct viewfinder in partial section, FIG. 5 the camera with extended direct viewfinder in cross-section, and FIG. 6 the direct viewfinder in the retracted position in partial plan view and in cross-section.

FIG. 2 shows the direct viewfinder 4 in the extended position and the mechanism used to extend the direct viewfinder. The direct viewfinder 4 is mounted inside the camera body 3 by means of a guide pin 5. The attachment of the guide pin 5 to the direct viewfinder 4 is in a side wall 4a. The guide pin 5 is guided inside the lower mount 3c and an upper mount 3b. An elastic means 7 surrounds the guide pin 5 and is provided at that end facing the upper mount 3c with a lock washer 6 which is also firmly connected to the guide pin 5. The elastic means 7 is preferably a compression spring. The movement of the direct viewfinder 4 upwards out of the camera body, vertically to the optical axis, is limited by the upper mount 3b against which the lock washer 6 rests when the direct viewfinder 4 is extended. As FIG. 2 shows, the direct viewfinder 4 projects above the camera body 3. Since the direct viewfinder 4 is made from a transparent, clear material, its interior is lined with a card 13, colored black to prevent reflection and also to mask the lenses (front lens 8 and eyepiece lens 9).

The rear view of the camera body 3 is shown in FIG. 3. In the retracted position (bold line) of the direct viewfinder 4, the top edge 3a of the camera body 3 passes horizontally through the direct viewfinder 4. The retracted direct viewfinder 4 is flush with the contour of the camera formed by the front shell 1 and the rear wall 2. A recess, in which a retaining nose 10a engages, is provided in a wall 4b opposite the side wall 4a of the direct view finder 4. The retaining nose 10a is provided on a film transport lever 10. Operation of the film transport lever 10 in the direction A pulls the retaining nose 10a back out of the area of the recess in the wall 4b and releases the direct viewfinder 4. The direct viewfinder 4 is moved to its operating position (shown as dashed line in FIG. 3) by the elastic means 7. A slot 2a is provided on the rear wall 2 of the camera body 3 in which the transport lever 10 is moved to convey the film further in direction A in order to bring a section of film to the position necessary for exposure.

Figure 4:
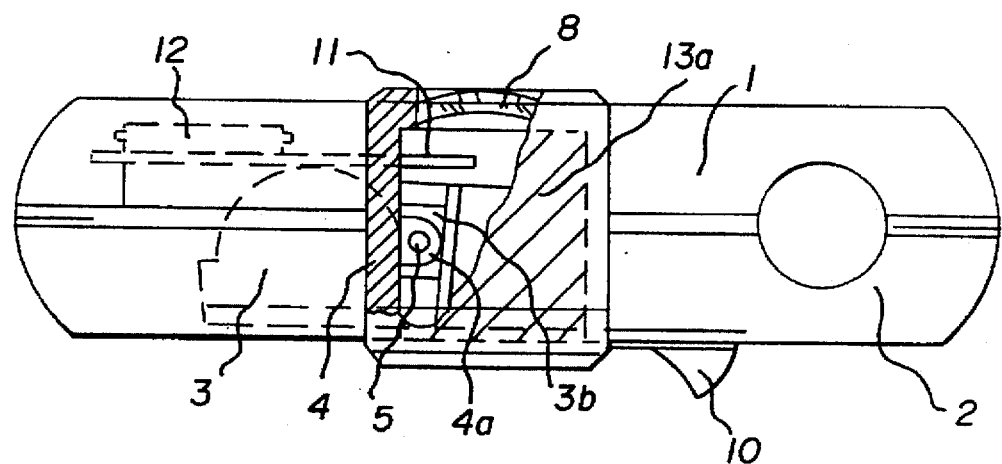

As FIG. 4 shows, the dimension of the direct viewfinder in the direction of the optical axis is slightly larger than the thickness of the camera, which is dictated by the dimensions of the front shell 1 and the rear wall 2. The part of the direct viewfinder 4 with the front lens 8 projects past the front shell 1, and the part with the eyepiece lens 9 past the rear wall 2 of the camera. On the left, according to the conventions shown and next to the direct viewfinder 4, the flash window 12 with the associated switching arrangement 11 is provided (both shown by dashed lines). The card 13 lining the direct viewfinder 4 can have camera information printed on outside 13a.

Figure 5:
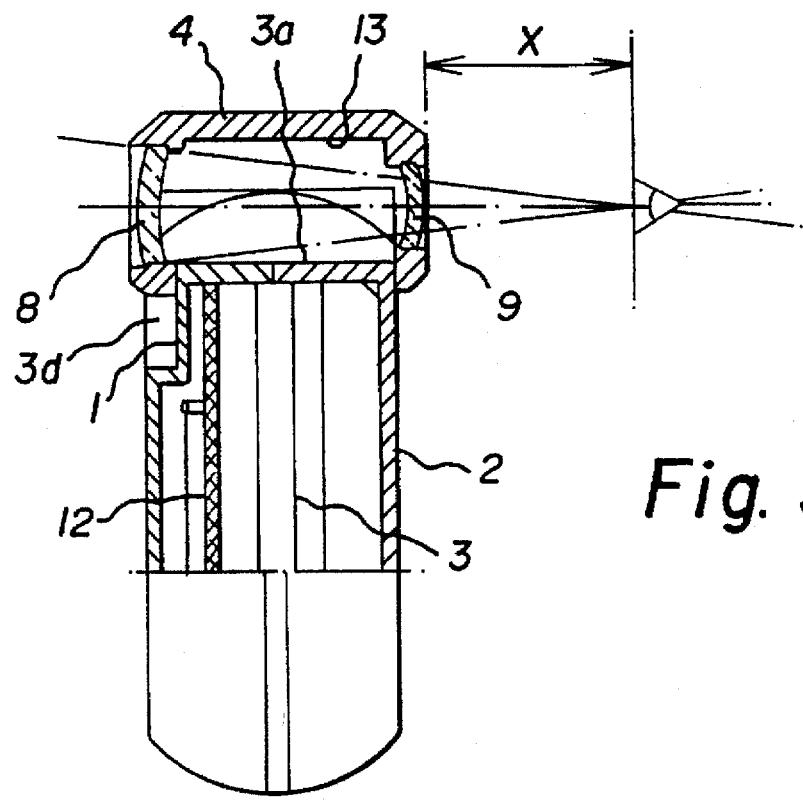
Figure 6:
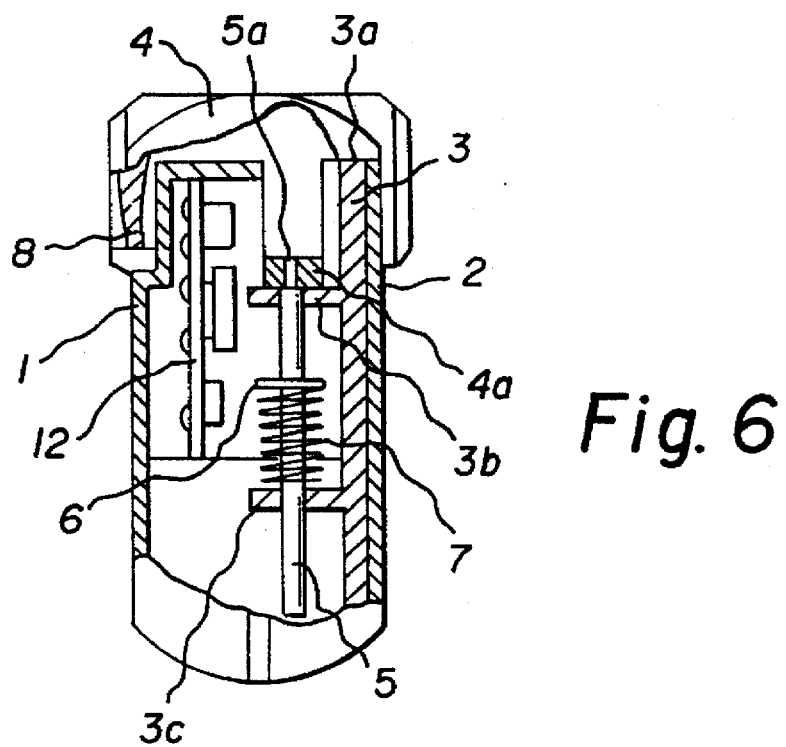

When the direct viewfinder is in the extended position, the user looks through it onto the object to be photographed (not shown). To do so, he holds the camera to one of his eyes such that the eyepiece lens 9 of the direct viewfinder 4 is at a distance X from the eye (see FIG. 5). The direct viewfinder 4 encloses with its dimensions the camera body 3. The part of the direct viewfinder 4 supporting the front lens 8 is guided in the recess 3d of the camera body. The direct viewfinder 4 is shown in FIG. 6 in the retracted position, also in a side view. The direct viewfinder 4a is pushed in far enough to be flush with the contour of the rear wall 2. The part of the direct viewfinder 4 supporting the front lens 8 completely covers the recess 3d of the camera body 3. Similarly, the wall 4a of the direct viewfinder 4 is in contact with the upper mount 3b of the guide rod 5. The guide rod 5 has at its end facing the upper mount 3b a pin 5a fastened in the wall 4a of the direct viewfinder 4. The upper mount 3b and the lower mount 3c are integral with the camera body 3. The elastic means 7 is in contact with the lower mount 3c and is held in the pushed-together position by the lock washer 6.

The object in accordance with the invention has been described in respect of a single-use camera, comprising essentially the camera body 3 with enclosing front shell 1 and rear wall 2. It is of course possible to arrange the direct viewfinder 4 in other cameras as well. Similar variations can easily be imagined as regarding the camera body. Variation can be carried out without departing from the scope of the claims.

What is claimed is:

1. A photographic camera comprising:
   a camera body; and
   an inverse Galilean optical direct viewfinder that is extendible out of the camera body vertically to the optical axis of said camera to an extended position and is retractable back into a retracted position in said camera body, is characterized in that:
   said direct viewfinder is a one-piece U-shaped component extending around said camera body and guided therein, having an integrated from lens and an integrated eyepiece lens, said direct viewfinder includes a second wall to lock said viewfinder in said retracted position, said wall being arranged adjacent to a film transport lever and provided with a recess for engaging a retaining nose integral with said transport lever, such that said direct viewfinder is lockable in said retracted position.

2. A photographic camera according to claim 1, wherein said direct viewfinder is produced of a transparent, clear material, and having inner walls which are lined with a colored black card.

3. A photographic camera according to claim 1, wherein a card on the outside of said direct viewfinder is printed with camera information.

4. A photographic camera according to claim 1, wherein a first wall of said direct view finder is connected to a guide rod guided in an upper mount and in a lower mount, said guide rod being surrounded by an elastic means capable of exerting a force on said direct viewfinder in a direction toward of said guide rod.

5. A photographic camera according to claim 4, wherein said elastic means is a compression spring having one end resting on a lock washer provided on said guide rod and another end in contact with the lower mount, in said extended position of said direct viewfinder said lock washer rests against the upper mount, and in said retracted position of said direct viewfinder said lock washer is at a distance from the upper mount.

6. A photographic camera according to claim 1, wherein said camera body is enclosed by a front shell and a rear wall.

7. A photographic camera according to claim 6, wherein said front shell and rear wall define an outer contour and said direct viewfinder is flush with said outer contour when said viewfinder in said retracted position.

8. A photographic camera according to claim 1, wherein said camera is a single-use camera.

9. A photographic camera comprising:
   a camera body defining an optical axis;
   a transport lever mounted in said camera body, said transport lever being movable from a first position to a second position, said transport lever having a retaining nose; and
   an inverse Galilean optical direct viewfinder that is extendible out of said camera body vertically to said optical axis to an extended position and is retractable back into a retracted position in said camera body, said direct viewfinder being unitary and having a U-shape extending around said camera body, said direct viewfinder having a recess disposed to engage said retaining nose only when said transport lever is in said first position and said direct viewfinder is in said retracted position, such that said direct viewfinder is lockable in said retracted position.

10. A photographic camera according to claim 9, wherein said direct viewfinder has an integrated front lens and an integrated eyepiece lens.

11. A photographic camera according to claim 9, wherein said direct viewfinder is made of a transparent material, and has inner walls which are lined with a card.

12. A photographic camera according to claim 9, further comprising a guide rod disposed in said body and an elastic means surrounding said guide rod, said direct viewfinder being connected to said guide rod, said elastic means being capable of exerting a force on said direct viewfinder in a direction toward said guide rod.

13. A photographic camera according to claim 12, wherein said body has an upper mount and a lower mount, said guide rod includes a lock washer, and said elastic means is a compression spring having one end resting on said lock washer and another end in contact with the lower mount, such that in said extended position of said direct viewfinder said lock washer rests against said upper mount, and in said retracted position of said direct viewfinder said lock washer is at a distance from said upper mount.

14. A photographic camera according to claim 13, wherein said camera body is enclosed by a front shell and a rear wall, said front shell and rear wall define an outer contour and said direct viewfinder is flush with said outer contour when said viewfinder in said retracted position.

15. A photographic camera according to claim 14, wherein said camera is a single-use camera.

16. A photographic camera according to claim 9, wherein said camera body is enclosed by a from shell and a rear wall, said front shell and rear wall define an outer contour and said direct viewfinder is flush with said outer contour when said view finder in said retracted position.

17. A photographic camera according to claim 9, wherein said camera is a single-use camera.

* * * * *